Figure 1:
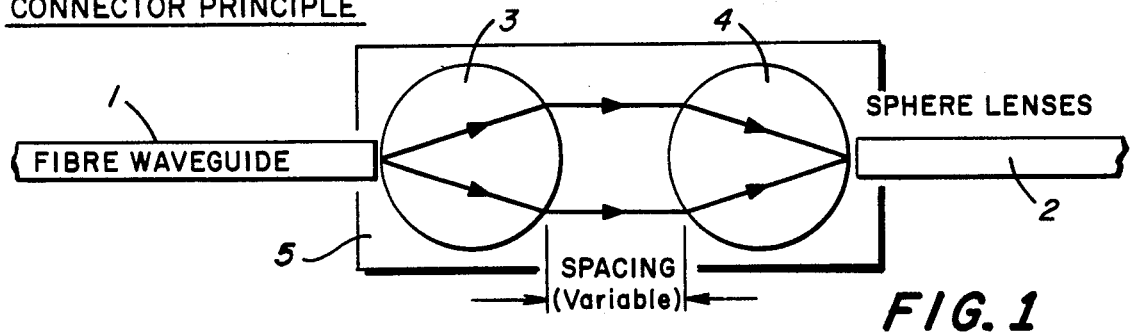

United States Patent [19]

Stewart et al.

[11] 4,304,461
[45] Dec. 8, 1981

[54] OPTICAL FIBRE CONNECTORS

[75] Inventors: William J. Stewart, Fritwell; John P. Dakin, Chandlesford, both of England

[73] Assignee: Plessey Handel und Investments AG., Zug, Switzerland

[21] Appl. No.: 105,073

[22] Filed: Dec. 19, 1979

Related U.S. Application Data

[63] Continuation of Ser. No. 925,761, Jul. 18, 1978, abandoned.

[30] Foreign Application Priority Data

Jul. 19, 1977 [GB] United Kingdom ............... 30197/77

[51] Int. Cl.³ ................................. G02B 5/14
[52] U.S. Cl. .................................. 350/96.18; 350/1.1; 350/416
[58] Field of Search ............... 350/96.18, 96.12, 96.13, 350/175 SL, 176, 1.1, 1.2, 1.3, 416

[56] References Cited

U.S. PATENT DOCUMENTS

| | | | |
|---|---|---|---|
| 3,724,383 | 4/1973 | Gallaghan | 350/96.18 |
| 3,950,075 | 4/1976 | Cook et al. | 350/96.18 |
| 4,056,307 | 11/1977 | Rayces | 350/176 |
| 4,109,994 | 8/1978 | Chown | 350/96.18 |
| 4,119,362 | 10/1978 | Holzman | 350/96.18 |
| 4,135,781 | 1/1979 | Archer | 350/96.18 |

FOREIGN PATENT DOCUMENTS

| | | | |
|---|---|---|---|
| 2703887 | 8/1977 | Fed. Rep. of Germany | 350/96.18 |
| 2334969 | 7/1977 | France | 350/96.18 |
| 7605819 | 12/1977 | Netherlands | 350/96.18 |

OTHER PUBLICATIONS

Tien et al. "Optical Waveguides of Single-Crystal Garnet Films", *Appl. Phys Lett*, vol. 21, No. 5, Sep. 1972.
"Electronics Letters", 3rd Aug., 1978, vol. 14, No. 16, pp. 511 and 512.

*Primary Examiner*—Stewart J. Levy
*Attorney, Agent, or Firm*—Fleit & Jacobson

[57] ABSTRACT

An optical fibre connector comprising in respect of each of the optical fibres to be connected, a connector body part formed at one end with a recess which accurately locates a sphere lens relative to an optical fibre receiving hole extending through the body part and terminating at the center of the recess whereby the axis of the optical fibre received by the hole and preferably bonded to the surface of the sphere lens. Connecting means is provided for connecting together in axial alignment two of the body parts with the sphere lenses of the parts arranged in opposed relationship.

4 Claims, 4 Drawing Figures

OPTICAL FIBRE CONNECTORS

This is a continuation of application Ser. No. 925,761, filed July 18, 1978, now abandoned.

This invention relates to optical fibre connectors for interconnecting the ends of optical fibres.

According to the present invention an optical fibre connector comprises in respect of each of the optical fibres to be connected, a connector body part formed at one end with a recess which accurately locates a sphere lens relative to an optical fibre receiving hole extending through said body part and terminating at the centre of said recess whereby the axis of the optical fibre received by said hole is aligned with the centre of the sphere lens, and in which connecting means is provided for connecting together in axial alignment two of said body parts with the sphere lenses of said parts arranged in opposed relationship.

The present invention provides for a high efficiency coupling between optical fibres of very small dimensions (i.e. less than 0.5 millimeters) which is difficult to achieve in disconnectable connectors affording butt connections between optical fibres of such small dimensions due to the intervention of dust particles etc. between, or surface irregularities in, the abutting ends of the fibres and/or lateral misalignment between the small fibre ends.

In carrying out the present invention the sphere lens of each connector body part may first be cemented or otherwise bonded into a spherical, tapered or cylindrical recess formed in the body part after which an optical fibre which fits snugly in a precision hole extending through said body part to the effective centre of the recess is pushed through the hole until the fibre end abuts against the sphere lens, the hole and fibre axis passing through the centre of the sphere lens. The end of the optical fibre is preferably bonded to the sphere lens, as by applying clear potting material for example to the end of the fibre before the fibre is pushed into the precision hole in the connector body part. The precise positioning of the hole relative to the body part recess automatically achieves axial and lateral alignment of the fibre and the sphere lens without need for further adjustment.

For the interconnection of the two connector body parts the parts themselves may be formed with mating means or they may be connected together by means of one or more mating ferrules or the like into which the body parts fit.

Figure 2:
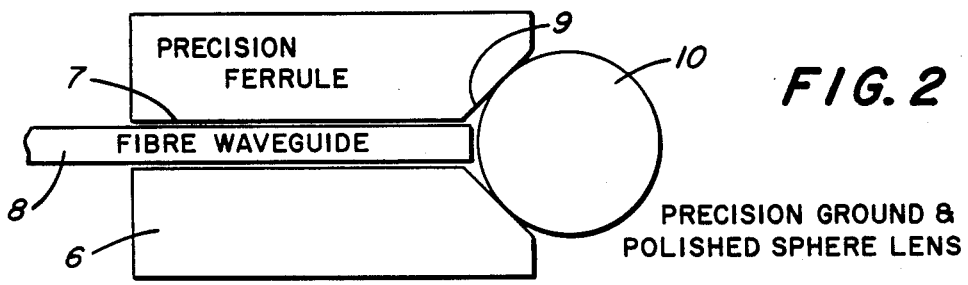
Figure 3:
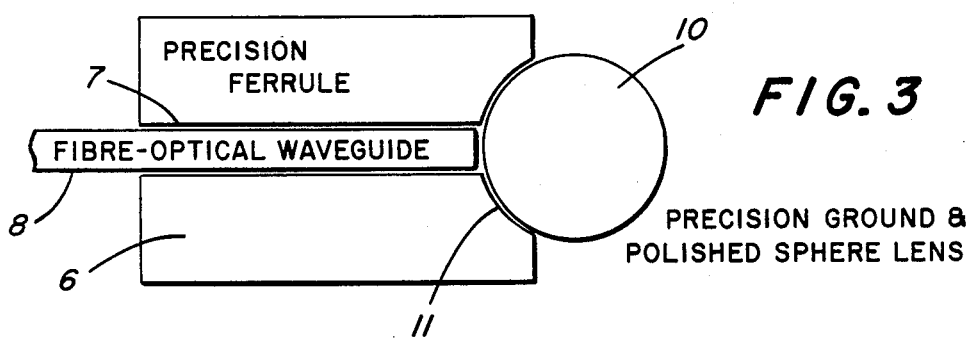
Figure 4:
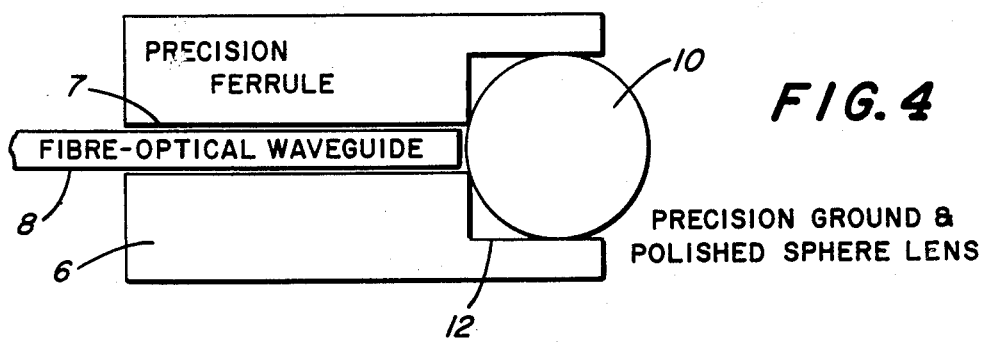

By way of example various embodiments of the present invention will now be described with reference to the accompanying drawing in which:

FIG. 1 shows the principle of construction of an optical fibre connector according to the invention; and FIGS. 2 to 4 show one of the co-operating connector parts of different embodiments of connector according to the invention.

Referring to FIG. 1 of the drawing this depicts the principle of construction of the connector which comprises two optical fibre waveguides 1 and 2 optically coupled together by means of two sphere lenses 3 and 4 against which the end of the fibres 1 and 2 preferably abut. The sphere lens 3 serves to collimate the light entering the sphere lens from the abutting end of optical fibre 1 whilst the sphere lens 4, the spacing of which from the sphere lens 3 is not critical but for normal connector purposes maximum efficiency is achieved when the spacing is about one sphere lens diameter, focusses the light on to the end of the optical fibre 2 abutting the sphere lens 4. As will be appreciated, the lateral or transverse alignment of the sphere lens and fibres of the two parts is not very critical but it is important to achieve accurate angular alignment of the fibre axes with one another. This will be provided by interconnecting means 5 for securing together the two body parts of the connector.

Referring to FIG. 2 of the drawing this shows a practical realisation of the connector shown diagrammatically in FIG. 1. FIG. 2 shows one of two co-operating connector body parts and comprises a cylindrical precision ferrule 6 which may be machined from metal or may be constituted by a precision jewel which is readily commercially available in synthetic saphire having a dimensional precision up to 1 micron accuracy. This ferrule 6 is formed with a precision hole 7 therethrough for snugly receiving an optical fibre 8 which may have a diameter of less than 0.5 millimeter. The precision hole 7 which is concentric with the outer cylindrical surface of the ferrule terminates at the apex of a conical recess 9 so that the axis of the hole 7 is coincident with the central axis of the conical recess 9. This conical recess accommodates a precision sphere lens 10 which may be cemented or otherwise bonded (e.g. laser bonded) to the ferrule 6 so that the axis of the precision hole 7 passes through the centre of the sphere lens.

After the sphere lens 10 has been secured to the ferrule 6 the optical fibre 8 will be inserted into the precision hole 7 until the end of the fibre abuts against the surface of the sphere lens 10. A clear potting material may serve to bond the end of the fibre to the sphere lens to secure the fibre to the lens to reduce reflection losses at the joint.

The sphere lens 10 may be composed of high refractive index glass having a refractive index of between 1.9 and 2.1 but other suitable crystalline materials for sphere lenses are calcium molybdate, yttrium gallium garnet and gadolinium gallium garnet, the two latter materials having particularly good hardness characteristics and being less susceptible than glass to moisture attack. In the case of synthetic sapphire, in which material precision spheres to an accuracy of 1 micron are already commercially available for use as bearings, the refractive index of 1.78 will be too low unless the fibre end is spaced from the surface of the sphere lens by the interposition of a suitable spacer or to provide a bi-convex lens between the two sphere lenses of the connector. With a view to reducing reflection losses from the sphere lenses the outer surface of the lens may be coated with a thin film of anti-reflection composition.

Referring now to FIGS. 3 and 4 of the drawing these show connector body parts similar to that described with reference to FIG. 2 except that the recesses 11 and 12 for receiving the sphere lenses 10 are of spherical and cylindrical form, respectively. Again, the axis of the optical fibre 8 must be coincident with the central axis of the spherical or cylindrical recess, as the case may be.

For the purpose of connecting two body parts such as those shown in FIGS. 2 to 4 inclusive together one or more cylindrical connecting members (not shown) which slidingly receive the ferrules in spaced relationship and which serve to interconnect the body parts together may be provided or the body parts may be adapted to provide a mating action.

What is claimed is:

1. An optical fibre connector for removably connecting two optical fibres in axial alignment comprising, in respect of each said optical fibre, a precision made cylinder having a precision through hole on its longitudinal axis for the reception of an end portion of said optical fibre, a recess formed in one end of said precision made cylinder, said recess having a circular cross-section, the axis of said precision through hole being aligned with the axis of said recess, an accurate precision made transparent sphere lens, said sphere lens being bonded in said recess, the end of said optical fibre being connected to said sphere lens by bonding without gaps therebetween such that the axis of said optical fibre is in alignment with the center of said sphere lens, the material of said sphere lens being selected from a group of relatively hard materials with a refractive index of approximately 2.0 comprising calcium molybdate, yttrium gallium garnet, gadolinium gallium garnet and synthetic sapphire, said lens having its outer surface coated with a thin film of anti-reflection material, and connecting means, said connecting means being adapted to connect together said two precision made cylinders with the axes of said optical fibres parallel and substantially in alignment.

2. The optical fibre connector of claim 1, wherein said recess has a conical shape.

3. The optical fibre connector of claim 1, wherein said recess has a semi-spherical shape.

4. The optical fibre connector of claim 1, wherein said recess has a cylinder shape.

* * * * *